No. 840,185. PATENTED JAN. 1, 1907.
O. W. YOUNG.
ENGINE VALVE.
APPLICATION FILED OCT. 31, 1904.

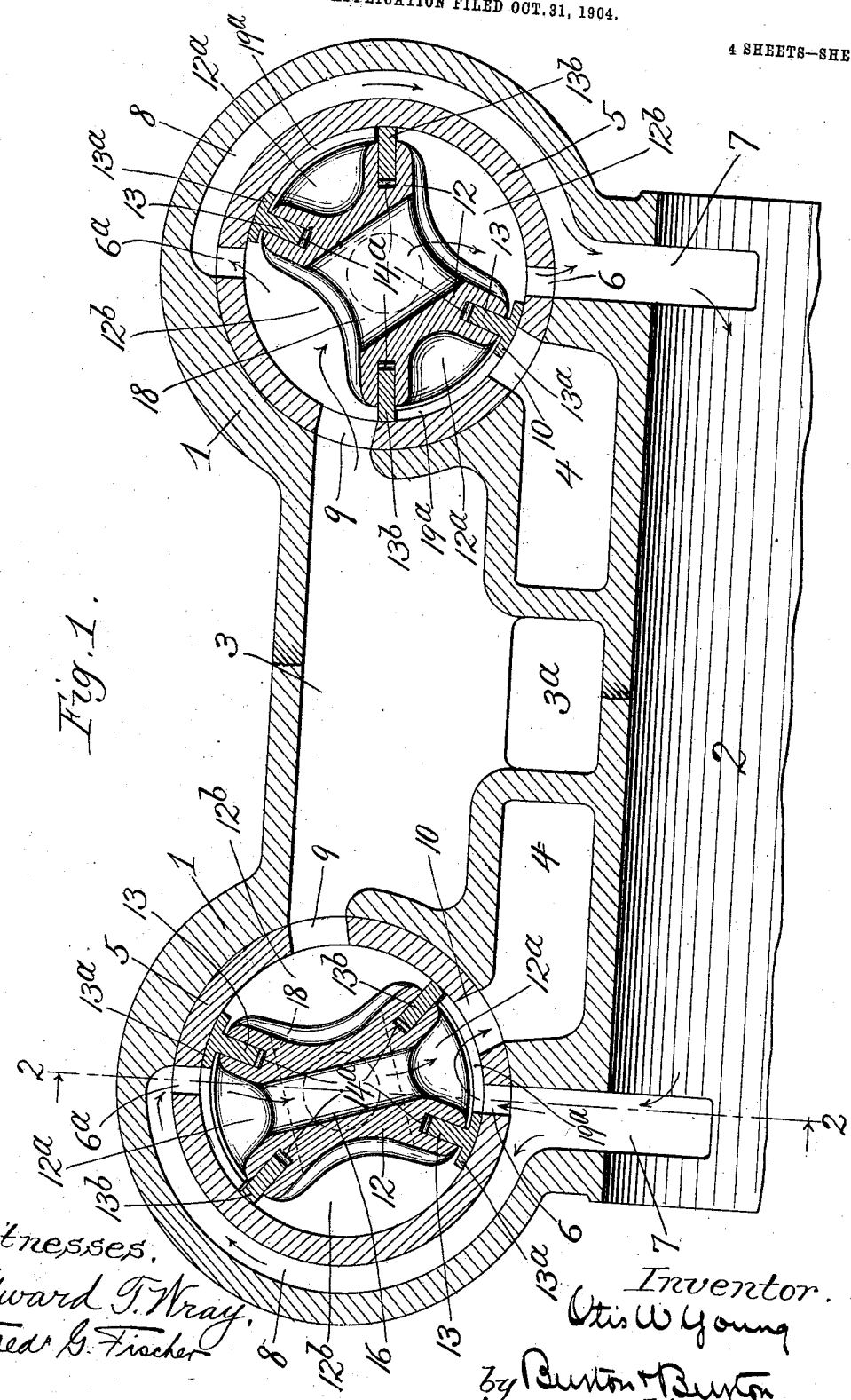

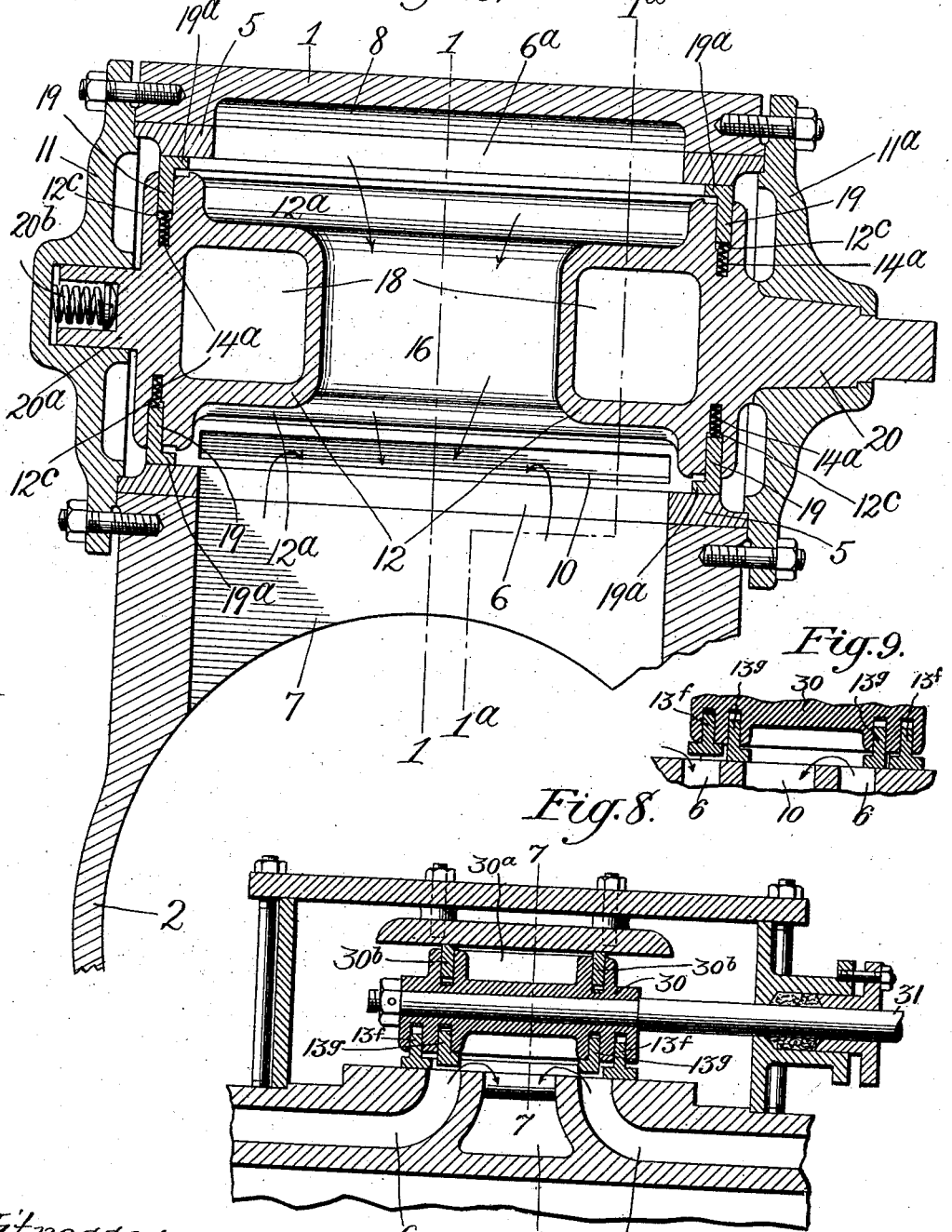

4 SHEETS—SHEET 3.

Witnesses.
Edward T. Wray.
Fred G. Fischer

Inventor.
Otis W. Young
by Burton Burton
his Atty's.

No. 840,185.  
PATENTED JAN. 1, 1907.

O. W. YOUNG.  
ENGINE VALVE.  
APPLICATION FILED OCT. 31, 1904.

4 SHEETS—SHEET 4.

Witnesses.  
Edward T. Wray.  
Fred G. Fischer.

Inventor.  
Otis W. Young  
by Burton & Burton  
his Atty's.

UNITED STATES PATENT OFFICE.

OTIS W. YOUNG, OF CHICAGO, ILLINOIS, ASSIGNOR TO YOUNG-MANN-AVERILL COMPANY, OF CHICAGO, ILLINOIS, A CORPORATION OF ILLINOIS.

ENGINE-VALVE.

No. 840,185.  Specification of Letters Patent.  Patented Jan. 1, 1907.

Application filed October 31, 1904. Serial No. 230,665.

*To all whom it may concern:*

Be it known that I, OTIS W. YOUNG, a citizen of the United States, residing at Chicago, in the county of Cook and State of Illinois, have invented new and useful Improvements in Engine-Valves, of which the following is a specification, reference being had to the accompanying drawings, forming a part thereof.

The purpose of this invention is to produce in a valve of the so-called "Corliss" type having a rocking movement a more perfect balance of the valve; to reduce friction of the valve upon its seat, and particularly to meet the conditions of uneven expansion and contraction for thus diminishing such pressure and consequent friction, and also in such a valve to secure the greatest possible area for port-opening for both inlet and outlet with a given comparatively short valve travel, also to provide a valve meeting the foregoing conditions constructed so as to cause the port-opening or steamway through the port to be increased when the port is partly covered by the valve and partly uncovered in excess of the amount of travel which the valve has made from or is about to make to the position at which it completely covers the port.

Figure 5:
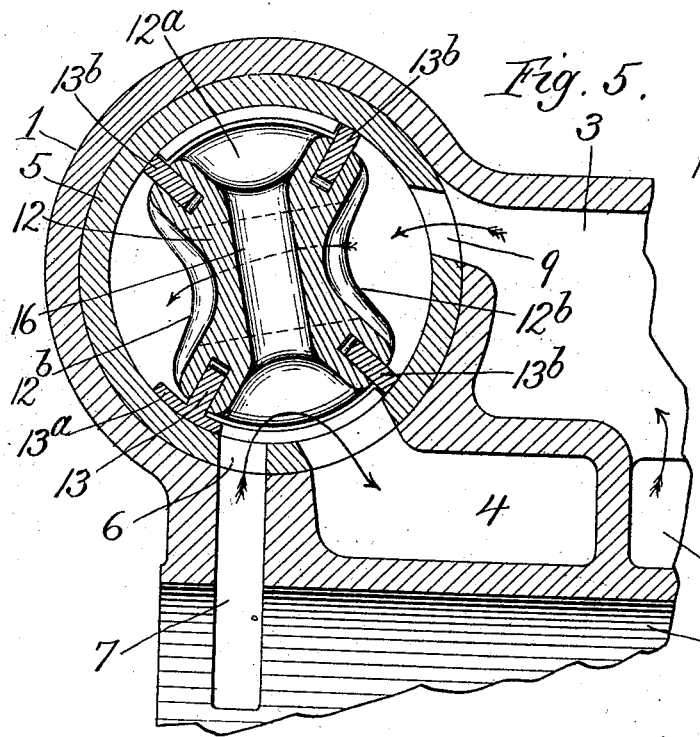
Figure 3:
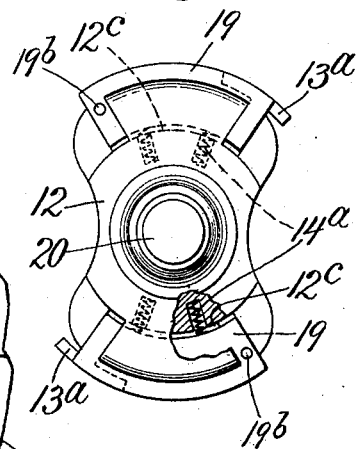
Figure 4:
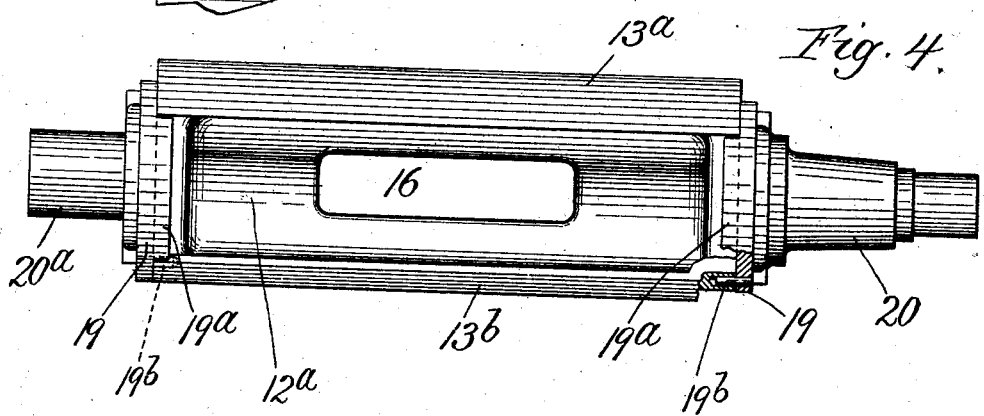
Figure 6:
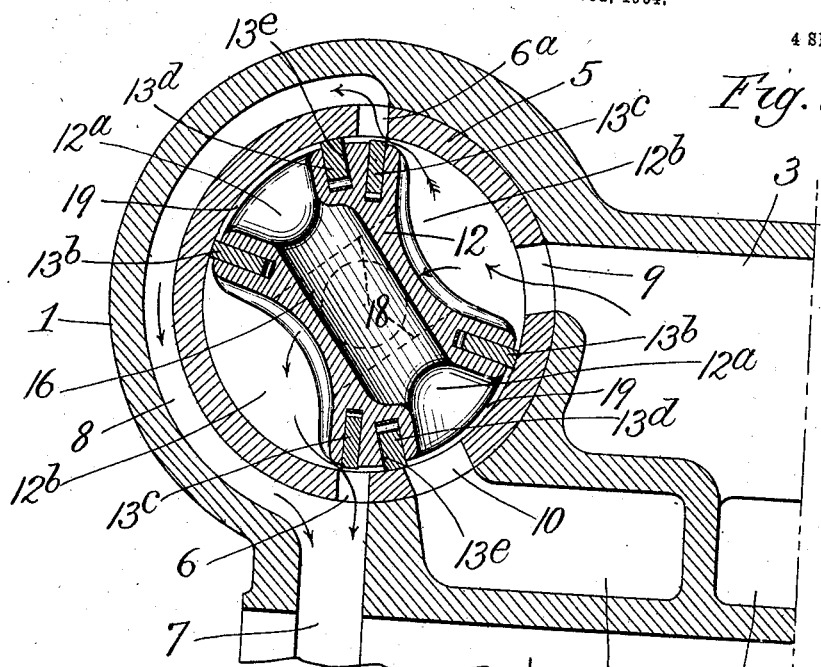
Figure 7:
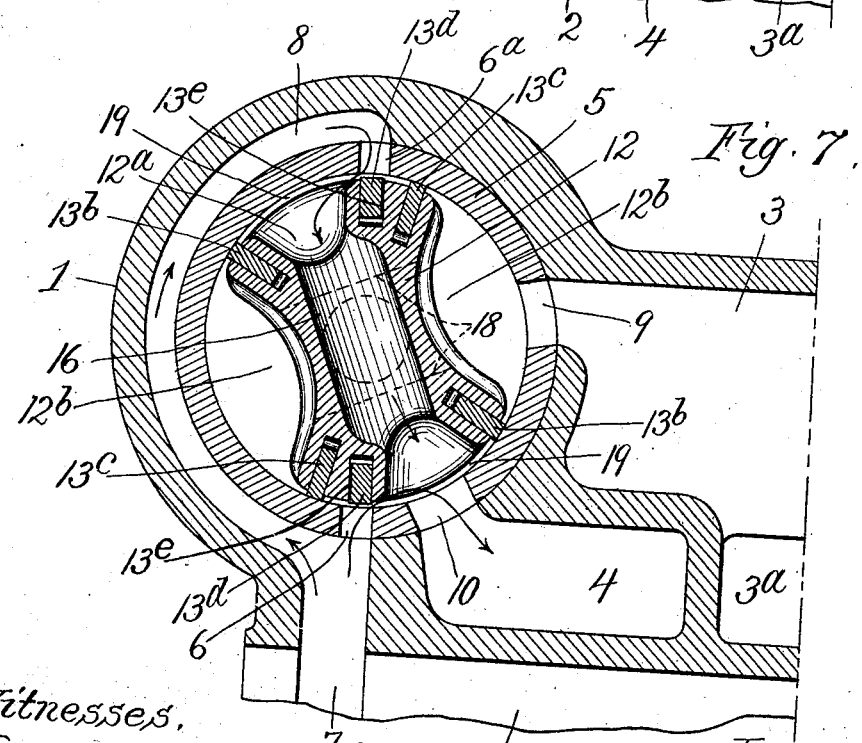

In the drawings, Figure 1 is a section longitudinal with respect to the cylinder and transverse with respect to the valves at the planes indicated by the lines 1 1 and 1ª 1ª, respectively, on Fig. 2 in an engine having double-ported construction with valves of the Corliss type. Fig. 2 is a section at the line 2 2 on Fig. 1. Fig. 3 is an end view of the valve shown in Fig. 2. Fig. 4 is a plan view of the valve shown in Fig. 2. Fig. 5 is a view similar to Fig. 1 in an engine having a single-ported Corliss or rocking valve construction. Fig. 6 is a view similar to the left-hand portion of Fig. 1, showing a modification of the valve-strip construction, the position of the valve shown being just after it has begun to open for inlet. Fig. 7 is a similar view showing the position of the valve just after opening the exhaust. Fig. 8 is a section axial with respect to the cylinder, at right angles to the valve-seat, of a portion of a cylinder and a flat slide-valve having the modified strip construction shown in Figs. 6 and 7, the position of the valve corresponding to that of the cylindrical valve shown in Fig. 7. Fig. 9 is a detail section of the construction in the same plane as that of Fig. 8, showing the same construction, the valve being in a position corresponding to that of the cylinder-valve shown in Fig. 6.

In the form shown in Figs. 1 and 2 the valve-chambers 1 1 extend transversely to the cylinder 2 at opposite ends of the latter, being formed quite similarly to the structure shown in my Patent No. 751,131, dated February 2, 1904, in an integral casting, which contains also the steam chest or reservoir 3 and the exhaust-passages 4 4 intermediate the steam-reservoir 3 and the cylinder and on opposite sides of the steam-inlet passage 3ª. The cylindrical cavity formed for the valve-chamber is bored out and lined with a metal bushing 5, which forms the valve-seats and constitutes the means for dividing the live from the exhaust steam and separating the various passages. Through the bushing 5 there are formed diametrically opposite ports 6 and 6ª, the former at the side toward the cylinder and leading directly to the port 7 thereof and the latter at the side remote from the cylinder and leading to the same by way of the passage 8, formed primarily as a groove or recess in the cylindrical cavity in which the bushing 5 is inserted, so that the insertion of the bushing converts said groove into a duct separated from the valve-chamber proper, which is the interior cavity of the bushing. Through said bushing 5 there are also formed ports 9 and 10, the former leading from the steam chest or reservoir 3 and the latter leading into the exhaust-passage 4. Against the opposite ends of the bushing 5 there are bound fast the heads 11 11, secured by bolts to the main casting in which the bushing is set. These heads afford journal-bearings for the spindles or stems of the valve-carrier 12. The construction in general of these spindles and their fitting in their respective seats is substantially the same as that shown in my said Patent No. 751,131, and for the purpose of the present invention it is sufficient to state that the spindle 20 is tapered and fixed into its journal-bearing correspondingly tapered and provided with suitable stop-shoulders to prevent it from binding too tightly by reason of the taper, and that the spindle 20ª at the opposite end is substantially cylindrical and is socketed at the end for lodgment of a coiled spring 20ᵇ, which reacts against the head 11 for thrusting the valve-carrier toward the opposite head, wherein the tapered spindle is seated. The construction of the carrier 12 is also in general the same as shown in my said Patent No. 751,131, being oblong in cross-section and having its longer dimension extending between the two ports 6 and 6ª, at the position occupied by the valve when open for exhaust. This valve-carrier has mounted in its diagonally-opposite longitudinal corners, and therefore at diametrically opposite positions, the valves proper, 13 13. Each of these valves is a strip of metal lodged in a groove extending longitudinally along the corner of the carrier, its depth being in direction radial to the axis of the carrier-spindles. The seating-face of the valve is formed by a cross-flange 13ª, rendering the entire valve T-shaped in cross-section. It will be understood that the outer surface of the cross-flange 13ª is cylindrically curved about the axis of the bushing 5, which forms the valve-seat. At the other two diagonally opposite longitudinal corners of the carrier there are similarly lodged therein—that is to say, in radial longitudinal grooves—strips 13ᵇ 13ᵇ, which have the function of partitioning the valve-chamber for the purpose of maintaining the separation between the live-steam spaces and the exhaust-steam spaces of the valve-chamber. At the opposite lesser sides of the oblong carrier, between the valve and the partition strip 13ᵇ at each side, the carrier has a recess 12ª, and these recesses defining the exhaust-spaces are connected by the aperture 16, which occupies the middle portion of the length of the carrier. (See Fig. 2.) The opposite longer sides of the carrier have somewhat similar recesses defining the live-steam spaces 12ᵇ, and these recesses are in communication through the apertures 18 18, extending through the carrier in the direction of its shorter transverse dimension at opposite sides of the middle aperture 16, which extends in the other transverse direction. This construction of the carrier is substantially that shown in my said Patent No. 751,131. The distance between the proximate parallel edges of the valve and partition strip bounding each exhaust-space 12ª is sufficient to embrace the cylinder-port 6 and exhaust-port 10 and the distance between the proximate edges of the port 6 and the inlet-port 9 is approximately the distance between the remote parallel edges of the valve and partition strip, so that the valve may stand in the position shown in the right-hand cylinder, Fig. 1, leaving the cylinder-port wide open for inlet, while the inlet-port 9 is also substantially wide open A slight space is left in the grooves in which the valve-strips and partition-strips are lodged back of said strips, so that the steam, gaining access thereto, operates over an area equal to the longitudinal cross-section of the grooves to seat the strips against the inner surface of the bushing 5. For initial seating in this manner springs 14ª may be employed suitably lodged at the bottom of the grooves. In order to complete the inclosure of the exhaust-spaces 12ª at opposite ends of the passage 16 and for separating the same from the live-steam spaces 12ᵇ, which communicate through the apertures 18, there are provided packing-segments or segmental disks 19 19 near each end of each of the lesser sides of the oblong carrier, such segmental packing-disks being lodged in grooves 12ᶜ, transverse to the axis of the carrier. Each of these packing-disks has its outer curved periphery, which forms its seating-face, increased by the formation of a flange 19ª, which projects inward, and the valve-strips and partition-strips are cut away to extend under these flanges and to meet their edges, as seen in Fig. 2. The parts being properly fitted it will be seen that each valve-strip and corresponding partition-strip and the two segmental packing-disks at the opposite ends of such valve-strip and partition-strip together completely encompass the exhaust-space 12ª, whose communication is therefore restricted to the corresponding space at the opposite side and the port 6 at that side of the bushing or valve chamber. To prevent the packing-segments 19 from escaping from their proper lodgment in the grooves provided for them near the ends of the valve-carrier, they are preferably connected, each at one end, with one end of the partition-strip, as by a dowel-pin 19ᵇ, taking through the packing-segment and into the end of the partition-strip. Both the partition-strip and the packing-segment will thus be free to move outward radially for perfect seating at their outer edges against the inner wall of the valve-chamber bushing 5, leaving the valve-strips each entirely free for like seating movement.

In single-ported-valve construction, with valves of the Corliss or rocking type, the same structure may be employed, except that in place of the valve-strip which controls the port 6ª there may be substituted another partition-strip 13ᵇ. In this strip-valve construction there are obtained certain advantages which will now be explained. Referring to the form shown in Figs. 1 and 2, it will be noticed that by reason of the strip-valve construction, in which the parts which must seat upon the inner wall of the valve-chamber for separating the live and exhaust steam comprise a plurality of strips encompassing the necessary area, each corresponding to one side of it only and adapted to move independently of the strips at all the other sides to seat and in which the carrier for this valve structure is mounted so as not to be movable bodily toward and from the seat, the pressure of each of such seating elements on its seat is that which is due to the seated area of that one element only, no pressure being transmitted from any other strip and no weight of the carrier or of the other strips being at any time imposed upon any of said strips or its seat, and that by this means the wear of each strip upon the seat—that is, the portion of the valve-chamber wall on which the strip presses and moves—is very greatly reduced below what it would be in any construction in which the whole weight of the carrier, constituting ordinarily in such constructions the valve as an integral element, and also the pressure of the motive fluid over an area equal to the entire unbalanced area of the valve-footing would operate to cause such pressure and consequent wear. There is also afforded by this construction the further advantage that, by reason of the capacity of the valve-strips to recede from the valve-seat, each independently of the remainder of the strips, and especially independently of the carrier, it is not necessary to make the provision which is ordinarily required for the valve, including the carrier, to lift bodily from the seat to relieve the cylinder in the cases in which such relief is necessary—as, for example, upon sudden reversing or other sudden arrest or retardment of the piston-stroke, because manifestly the lifting of the valve-strip alone will afford all the relief, and by reason of the fact that the relief is obtained by the lifting of the valve-strip alone, leaving the partition-strips and packing-strips still in contact with the seat, there is avoided the tipping up of the carrier (or of the valve as an integral structure including the carrier in the common construction) which, incidentally to the relief which is afforded by such lifting, is liable to cause one corner, end, or side of the valve to plow the seat and also to open communication between the exhaust and steam spaces of the valve-chamber around the ends and past the partition edge of the valve. This construction also obviates the necessity, which would otherwise exist, of mounting the valve on its stem with the range of movement transversely thereto necessary for permitting the lifting of the valve from its seat, and, on the contrary, the carrier is mounted rigidly on the stem and the stem is mounted and guided in bearings which are fixed with respect to the seat, the entire accommodation being afforded by the movement of the valve-strips in the grooves of the carrier. A very important advantage of this strip-valve construction in any form of valve to which it may be applied is that each strip, independently of all the rest, may wear to its seat or path and become accurately fitted thereto as a ground-in valve, and thus each strip may become tight and accurate in respect to its fit on its seat by the minimum amount of wear, whereas a valve formed integrally as to the entire area corresponding to the four strips, which in this construction are separate, would have to wear on its seat or path enough to grind out the maximum irregularity existing at any part of the area before the seating would be perfect, and whereas each of the four strips might seat perfectly upon the first assembling of the parts the entire structure which would be produced by uniting the four strips rigidly as an integral structure, might require a large amount of wear or dressing before it would maintain close fit on its seat throughout its entire path of travel. This feature of construction is of especial importance in a rocking or oscillating valve structure such as shown in Figs. 1, 2, and 3 of the drawings, in which the valve-chamber is cylindrical, because such cylindrical chamber, when exposed to the heat of the steam, which, in view of the varying thickness of metal at different parts of the chamber, will cause the latter to expand unequally at different parts, becomes distorted from its true cylindrical form, so that a valve structure rigid throughout cannot be kept properly fitted, and will either bind or leak at one part or another of its path of oscillation. This inequality or irregularity of expansion and contraction of such a cylindrical-valve chamber when exposed to varying conditions of steam, however, does not prevent each individual strip of the strip-valve construction from being properly seated at all times, and so adapting the valve to move easily—that is, without binding—while at the same time perfectly performing the function dependent upon the fit of the valve-strips on their respective seats or paths.

In the forms shown in Figs. 6 and 7 there is illustrated a modification of this invention which consists in dividing each strip-valve into two members, one of which, 13$^c$, has the steam edge and the other, 13$^d$, the exhaust edge, the two strips being mounted independently in corresponding grooves in the carrier, with the range of movement toward and from the seat already described. The effect of this divided construction is that in any case in which the valve would be lifted off its seat for relief of the cylinder only one of the two members will be lifted, and thereby there will always be maintained separation between the live and exhaust steam spaces of the valve-chamber. Fig. 6 shows a position of the valve with respect to the ports which would occur upon reversing the engine, so as to produce excessive pressure in the cylinder requiring relief when the valve had just commenced to open for inlet. The reversion would cause the member of the opening valve having the steam edge to be lifted, as shown. If the strip-valve consisted of one member only, as in Fig. 2, the entire strip being lifted, communication would be opened between the live and exhaust steam spaces of the valve-chamber. There is a further advantage which results from this divided structure of the strip-valves—viz., that it permits the steam-edge member of the divided valve-strip to be opened by lifting from its seat during compression by the piston in the finish of its stroke either before it would open by the travel of the valve or in addition to such initial opening, thus giving a more prompt and rapid admission of steam than would otherwise be obtained without involving any change of adjustment or timing of the valve action, which would naturally tend to hasten the cut off. The increased opening obtained by the lifting of the steam-edge member over and above what would occur from the travel will be readily seen from Fig. 6. A similar advantage may occur at the point of the action shown in Fig. 7 when the valve at one end of the cylinder is opening for exhaust and that at the other end is about to close the exhaust, the closing at the one end being retarded and the opening at the other end hastened by the lifting of the exhaust-edge member of the divided valve from its seat, which will occur by virtue of the fact that the back edge of that strip is exposed to the cylinder-pressure which can reach it by leakage past the face of the strip at the side toward the cylinder-port, because this strip is narrower than the other and the channel in which it is lodged in the carrier is correspondingly shallower and is completely closed by the end of the packing-strip 19, which being only of the width of the strip $13^c$, which has the steam edge, does not prevent access of the steam back of said last-mentioned strip. The strip $13^d$ will be returned to its seat by the cylinder-pressure as soon as the latter has time to reach the back edge of the strip. To insure the seating of this strip by cylinder-pressure in all cases when it should be held seated and prevent the steam blowing over into the exhaust-space by lifting it when the exhaust should be closed, I provide special facility for steam leaking past the face of this strip toward the cylinder-port by making a few fine furrows $13^e$ on this face of the strip. In the form in which this modification is shown as applied to the cylindrical valve structure in Figs. 6 and 7 it affords an advantage in addition to those above pointed out, consisting in the fact that the strips are made without flanges at their seating edge, so that the total area of the strips exposed to steam-pressure for seating them is their cross-section in the channels in which they are lodged and guided in the carrier, and this cross-section is very much less than the total face necessary to be given to the strip-valve when made in one piece, as shown in Figs. 1 and 2, the total distance from the steam edge to the exhaust edge being the same in the divided structure as in the integral structure, but said distance being largely made up of the interval between the two strips in the divided structure. This greatly reducing the friction of the strips upon the cylindrical wall of the valve-chamber diminishes the wear and increases the life between repairs of the valve. Another advantage arises from dispensing with the flanges—namely, that whereas when the flanges are employed as is necessary when the strip-valve is integral, n order to get a proper distance between steam edge and exhaust edge, the carrier must be in diameter less than the valve-chamber by the amount of the thickness of the flanges added to whatever play is allowed, whereas when the flanges are dispensed with the carrier may have the full diameter of the cylinder less only than the play to be allowed to the strip. This brings the lateral support of the strips which the carrier affords them just so much nearer to the edge of the strip at which the friction on the valve-chamber wall occurs, and to that extent prevents the tendency of the dragging action of the strip on the chamber-wall from producing a lateral wear upon the strips and the walls of the channels in which they are lodged in the carrier. There is also the further advantage that, s nce the steam edge of the valve is the edge of the lateral face of the strip which bears on the channel-wall, any wear which might cause a play or lost motion, permitting the strip to tip slightly in its channel, will result in a negligible wear upon the seating-face of the strip at the steam edge, whereas in the case of flanged construction similar tipping would be liable to cause a beveling or wearing away of the flange which might extend for a distance from the steam edge which would not be negligible, but which would result in undesirable preadmission of steam and inexactness of cut off. The positions of the strip-valve in Fig. 6 may also occur under any conditions in which there is an excessive cylinder-pressure—as, for example, when the engine is running with very short cut-off and so rapidly that the compression at the end of each stroke for an instant exceeds the steam-chest pressure, which with an integral or single-piece strip-valve would tend to cause such strip-valve to lift and open communication between the live and exhaust steam, with resultant loss of steam, while the divided construction shown merely causes the excess pressure to react back into the steam-chest without loss.

In Fig. 9 there is shown a structure of a flat-valve construction in which the strip-valve is divided into two parts, one having the steam edge and the other the exhaust edge, but in which the two strips are flanged. The strips are shown in this figure in the position corresponding to the position of the analogous strips of the oscillating cylindrical-valve structure in Fig. 6, and the action consisting of the lifting of the strip 13$^f$, which has the steam edge, would occur in this flanged construction precisely as in the construction shown in Fig. 6 and for the same reason under like circumstances as above described with respect to said cylindrical-valve structure. In Fig. 8 there is shown the position of the valve-strips of the structure represented in Fig. 9 at the position corresponding to that of the rocking cylindrical valve in Fig. 7. In this structure of flat valve, in which the strips are flanged, the same action of the divided strip above described as occurring in case of very short cut-off and rapid running, causing overcompression at the end of the stroke, may occur when the engine is running with short cut-off, even without excessive compression and with some advantage in respect to efficiency, and Figs. 9 and 10 may represent the position of the parts of such a valve in such case, for in this construction the valve-strip 13$^f$, which has the steam edge, has its flange of the width of the cylinder-port, so that it will be lapped beyond that port a distance equal to the amount that the port is uncovered at the steam edge as soon as the opening commences for inlet, and the pressure being balanced except as to the area thus lapped and there being no pressure operative back of this area pressing the valve toward the seat except a negligible amount which may occur from leakage around this strip there will be an excessive pressure corresponding to this unbalanced area tending to lift the strip from the seat, and such lifting will increase the steam-inlet, as described and shown in Fig. 8. The same action will occur both as the valve opens and as it closes, so that without increasing the duration of opening the efficiency for supplying the steam is increased.

I claim—

1. In an engine, a valve structure for controlling the motive fluid comprising a cylindrical valve-chamber; a valve-carrier mounted axially therein for rocking movement completely inclosed in the chamber, the cylindrical wall of the chamber having opening through it a steam-inlet port and other ports for communication with the engine-cylinder and with the exhaust respectively; strips lodged in such carrier extending longitudinally parallel with the axis of the carrier, with range of movement relative thereto toward and from the cylindrical face of the chamber, said strips being in pairs, the members of each pair being exposed adequately to afford between them communication from the cylinder-port to the exhaust-ports, the proximate members of the two pairs being spaced apart about the circumference of the chamber adequately to embrace between them the steam-inlet port and the full range of the rocking movement of the valve; two pairs of other strips mounted in the carrier extending transversely with respect to the first-mentioned pairs of strips and the axis and abutting edgewise upon the same cylindrical face of the valve-chamber upon which the longitudinal strips abut, and through which the ports open, and abutting sidewise upon the ends of the said strips, and having range of movement in the carrier toward and from said face.

2. In an engine, a valve structure comprising a valve-carrier; means for moving it and for guiding it in an invariable path; a valve proper comprising two strips lodged separately in the carrier extending transversely to its path of movement with range of movement in the carrier toward and from the valve-seat, the remote longitudinal corners of the seating edges of said strips being respectively the "steam edge" and the "exhaust edge" of the valve.

3. In an engine, a valve structure comprising a valve-carrier, means for moving it and for guiding it in an invariable path; a valve proper consisting of two strips lodged separately in the carrier extending transversely to its path of travel with range of movement in the carrier toward and from the valve-seat, one of said strips having the "steam edge" and the other having the "exhaust edge" of the valve, the channel of the carrier in which the exhaust-edge strip is lodged being shallower than that for lodging the steam-edge strip; packing-strips lodged in the carrier at the ends of the valve-strips, closing the exhaust-edge-strip channel but not closing the steam-edge-strip channel, the exhaust-edge strip being provided with means for slight admission of steam past its face in the channel at the side toward the cylinder-port.

4. In an engine, a valve structure comprising a valve-carrier and means for moving it and for guiding it in an invariable path; a valve proper consisting of two strips lodged separately in the carrier extending transversely to its path of travel, with range of movement in the carrier toward and from the valve-seat, one of said strips having the steam edge and the other having the exhaust edge of the valve; means for closing at the ends the channels of the carrier in which the strip having the exhaust edge is lodged, the channel for lodgment of the other strip being open at the ends whereby the steam-pressure in the valve-chamber is admitted back of the last-mentioned strip and is not admitted back of the exhaust-edge strip, and means for admitting steam to the back edge of the exhaust-edge strip from between the seating edges of the two strips.

In testimony whereof I have hereunto set my hand, in the presence of two witnesses, at Chicago, Illinois, this 15th day of September, 1904.

OTIS W. YOUNG.

In presence of—
   CHAS. S. BURTON,
   FRED. G. FISCHER.